US012718186B2

(12) United States Patent
Ziegler et al.

(10) Patent No.: US 12,718,186 B2
(45) **Date of Patent: *Aug. 25, 2026**

(54) SHIPPING CONTAINER TRACKING METHODS

(71) Applicant: TelemeTrak, Inc., Oakland, CA (US)

(72) Inventors: Frederick Steinway Ziegler, San Francisco, CA (US); Mats Alaküla, Lund (SE)

(73) Assignee: Teleme Trak, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/075,382

(22) Filed: Mar. 10, 2025

(65) Prior Publication Data

US 2025/0232251 A1 Jul. 17, 2025

Related U.S. Application Data

(63) Continuation of application No. 17/503,302, filed on Oct. 16, 2021, now Pat. No. 12,248,901.

(51) Int. Cl.

| | |
|---|---|
| ***G06Q 10/0833*** | (2023.01) |
| ***F03D 7/06*** | (2006.01) |
| ***G06Q 10/0832*** | (2023.01) |
| ***H02K 1/34*** | (2006.01) |
| ***H02K 7/02*** | (2006.01) |
| ***H02K 35/02*** | (2006.01) |
| ***H02K 99/00*** | (2014.01) |
| *F03B 13/14* | (2006.01) |
| *H02J 50/00* | (2016.01) |

(52) U.S. Cl.

CPC ........... *G06Q 10/0833* (2013.01); *F03D 7/06* (2013.01); *G06Q 10/0832* (2013.01); *H02K 1/34* (2013.01); *H02K 7/025* (2013.01); *H02K 35/02* (2013.01); *H02K 99/10* (2016.11); *F03B 13/14* (2013.01); *H02J 50/001* (2020.01); *Y02E 10/30* (2013.01)

(58) Field of Classification Search

CPC ........ H02K 99/10; H02K 7/025; H02K 35/02; H02K 1/34

See application file for complete search history.

(56) References Cited

U.S. PATENT DOCUMENTS 5,707,215 A * 1/1998 Olney .................. B60C 23/133 417/328
5,850,111 A * 12/1998 Haaland ................ H02K 44/24 310/15

(Continued)

*Primary Examiner* — Sean Gugger
(74) *Attorney, Agent, or Firm* — The Law Office of Raul D. Martinez, PC

(57) ABSTRACT

The devices and methods described herein are utilized to continuously track unpowered logistics platforms such as semi-trailers and intermodal shipping containers. In some examples, a tracking device harvests the kinetic energy of oscillatory movements of the shipping container to power the tracking device. In some instances, the shipping container is moving on a roadway, railway, or waterway. In other examples, a tracking device harvests the kinetic energy of airflow moving around the shipping container. In some instances, the airflow is caused by movement of the shipping container. In other instances, the airflow may be caused by ambient weather such that air is flowing around a stationary shipping container.

14 Claims, 9 Drawing Sheets

(56) References Cited

U.S. PATENT DOCUMENTS

| | | | | | |
|---|---|---|---|---|---|
| 2004/0183673 | A1* | 9/2004 | Nageli | G08G 1/20 | 340/8.1 |
| 2009/0200983 | A1* | 8/2009 | Dyer | H02K 35/02 | 320/107 |
| 2011/0187101 | A1* | 8/2011 | Beane | F03B 13/00 | 290/53 |
| 2015/0162799 | A1* | 6/2015 | Ilan | F16F 15/03 | 310/90.5 |
| 2016/0036375 | A1* | 2/2016 | Ansari | F03G 6/001 | 206/216 |

* cited by examiner

SHIPPING CONTAINER TRACKING METHODS

CLAIM OF PRIORITY

The present application is a continuation of and claims priority to U.S. patent application Ser. No. 17/503,302, entitled "DEVICES AND METHODS FOR TRACKING SHIPPING CONTAINERS" and filed Oct. 16, 2021, which is assigned to the assignee hereof and hereby expressly incorporated by reference in its entirety.

FIELD

The subject matter described herein relates to devices and methods for tracking shipping containers and more particularly to utilizing the movement of the shipping container and/or airflow around the shipping container to power the tracking devices.

BACKGROUND

Numerous parties to a cargo shipment may wish to know the location of the cargo being transported. For example, such parties may include: a trucking company towing the shipment; a leasing company leasing the trailer, chassis, or intermodal shipping container carrying the shipment; the buyer, seller, and the insurer of the shipment; or a governmental entity that regulates the cargo in the shipment. However, most unpowered logistics platforms, such as semi-trailers, chassis, and intermodal shipping containers, do not have a reliable electrical power source that can adequately power electronics for tracking the location of a cargo shipment.

SUMMARY

The devices and methods described herein are utilized to continuously track unpowered logistics platforms such as semi-trailers, chassis, and intermodal shipping containers. In some examples, a tracking device harvests the kinetic energy of oscillatory movements of the shipping container to power the tracking device. In some instances, the shipping container is moving on a roadway, railway, or waterway. In other examples, a tracking device harvests the kinetic energy of airflow moving around the shipping container. In some instances, the airflow is caused by movement of the shipping container. In other instances, the airflow may be caused by ambient weather such that air is flowing around a stationary shipping container.

DETAILED DESCRIPTION

Coupling Terminology

Figure 1:
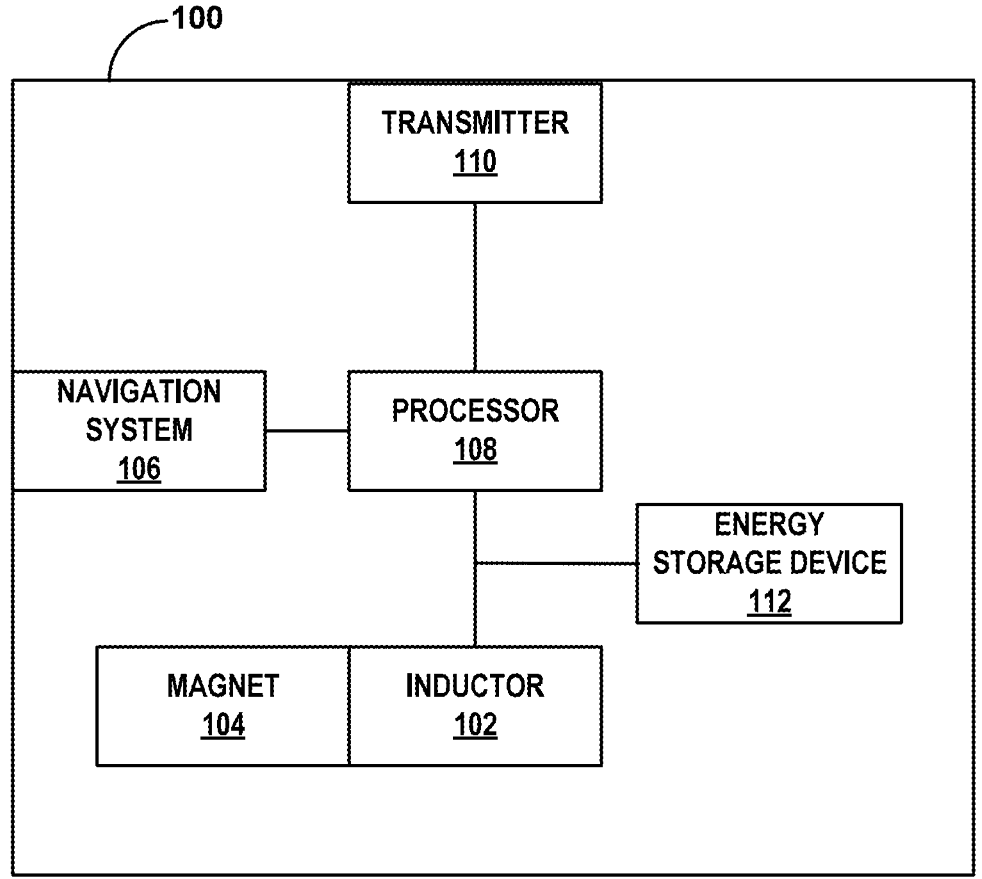
FIG. 1 is a block diagram of an example of a tracking device that generates power from the oscillatory movement of the shipping container.

In one embodiment, if a first physical object is physically coupled to a second physical object and said second physical object is physically coupled to a third physical object, then said first physical object is physically coupled to said third physical object.

In one embodiment, if a first physical object is physically coupled to a second physical object then said second physical object is physically coupled to said first physical object.

In one embodiment, a first physical object is physically coupled to a second physical object and said first physical object may rotate independently of said second physical object.

In one embodiment, a first electronic device is electrically coupled to a second electronic device if said first electronic device can send electrical power to said second electronic device.

In one embodiment, if a first electronic device is electrically coupled to a second electronic device then said second electronic device is electrically coupled to said first electronic device.

Trucking Terminology

In one embodiment, a towed transport platform comprises a means for supporting a load and for being towed on a road.

In one embodiment, a towed transport platform comprises a trailer.

In one embodiment, a towed transport platform comprises a semi-trailer.

In one embodiment, a towed transport platform comprises a chassis and, in some cases, an intermodal chassis.

In one embodiment, a towed transport platform comprises an intermodal shipping container.

In one embodiment, a tractor platform comprises a motive power source and a means for towing a towed transport platform.

In one embodiment, an intermodal shipping container comprises a standardized shipping container designed and built for intermodal freight transport.

In one embodiment, a chassis comprises a towed transport platform with a means for physically coupling one or more intermodal shipping containers to said towed transport platform.

Terminology for Transmitting and Sensors

In one embodiment, a transmitting device may include wireless modem and protocol suitable for cellular, Wi-Fi (e.g., a wireless network protocol based on Institute of Electrical and Electronics Engineers (IEEE) 802.11), radio, infrared, satellite, Zigbee, and microwave (WiMax) signaling.

Terminology for Energy and Physics

In one embodiment, kinetic mechanical energy comprises the kinetic energy of a mechanical system.

In one embodiment, kinetic mechanical energy comprises the linear and rotational motion of a mechanical system.

In one embodiment, kinetic mechanical energy comprises the energy of a mechanical system that is independent of the potential energy of said mechanical system.

In one embodiment, rotational mechanical energy comprises the rotational component of a mechanical system's kinetic mechanical energy.

In one embodiment, mechanical power comprises kinetic mechanical energy expended per unit.

Terminology for Power Generation

In one embodiment, a kinetic motion power generator comprises a means for converting kinetic energy into electrical power.

In one embodiment, a kinetic motion power generator comprises a means for converting kinetic energy from the motion of a towed transport platform into electrical power.

In one embodiment, a dynamo comprises a means for converting kinetic mechanical energy into electrical power.

In one embodiment, a kinetic motion power generator comprises a dynamo.

In one embodiment, an electric generator comprises a means for converting rotational mechanical energy into electrical power.

In one embodiment, an electric generator comprises a means for converting rotation into electrical power.

In one embodiment, a dynamo comprises an electric generator.

In one embodiment, a turbine comprises a means for converting the kinetic energy of a moving fluid into rotational mechanical energy.

In one embodiment, a turbine comprises a means for converting the kinetic energy of airflow resulting from the motion of a towed transport platform into rotational mechanical energy.

In one embodiment, a turbine comprises a means for converting airflow into rotation.

In one embodiment, a turbine electric generator comprises a turbine physically coupled to an electric generator wherein the rotational mechanical energy of said turbine is converted into electrical power by means of said electric generator.

In one embodiment, a dynamo comprises a turbine electric generator.

In one embodiment, a kinetic motion power generator comprises a turbine electric generator.

In one embodiment, a gearing comprises a means for transmitting rotational mechanical energy from one mechanical system to another mechanical system.

In one embodiment, a gearing comprises a means for transmitting the rotation of one mechanical system to another mechanical system.

In one embodiment, a geared electric generator comprises an electric generator physically coupled to a gearing that is physically coupled to a rotational mechanical energy source wherein the energy of said rotational mechanical energy source is converted into electrical power by means of said electric generator.

In one embodiment, a rotational mechanical energy source comprises a towed transport platform wheel that rotates when said towed transport platform is in motion.

In one embodiment, a rotating wheel component comprises a wheel, tire, axle, or other component of a wheel that rotates when said wheel rotates.

In one embodiment, a rotating wheel component comprises a rotating wheel component of a towed transport platform wheel.

In one embodiment, a geared electric generator comprises an electric generator physically coupled to a gearing that is physically coupled to a rotating wheel component wherein rotational mechanical energy of said rotating wheel component is converted into electrical power by means of said electric generator.

In one embodiment, a dynamo comprises a geared electric generator.

In one embodiment, a kinetic motion power generator comprises a geared electric generator.

In one embodiment, a change in magnetic flux induces electrical power in an inductor.

In one embodiment, a magnet passing by an inductor induces electrical power in said inductor.

In one embodiment, an energy storage device comprises a means for converting power into potential energy and a means for converting said potential energy back into power.

In one embodiment, an electrical energy storage device comprises a means for converting electrical power into potential energy.

In one embodiment, a magnet comprises a body having the property of attracting iron and producing a magnetic field external to itself.

In one embodiment, a magnet comprises a body producing a magnetic flux external to itself.

In one embodiment, a magnet comprises a means for producing magnetic flux.

In one embodiment, an inductor comprises an electrically conductive material arranged in one or more coils such that a change in magnetic flux along the axis of said coil induces an electric current in said coil.

In one embodiment, an inductor comprises a means for converting changing magnetic flux into electrical power.

In one embodiment, an electrical energy storage device comprises a means for converting electrical power into potential energy and a means for converting said potential energy back into electrical power.

In one embodiment, an electrical energy storage device comprises a battery.

In one embodiment, an electrical energy storage device comprises a capacitor.

In one embodiment, an energy storage device comprises an electrical energy storage device.

In one embodiment, a mechanical energy storage device comprises a means for converting mechanical power into potential energy.

In one embodiment, a mechanical energy storage device comprises a means for converting potential energy into mechanical power.

In one embodiment, a mechanical energy storage device comprises a means for converting mechanical power into potential energy and a means for converting said potential energy into mechanical power.

In one embodiment, a mechanical energy storage device comprises a means for converting rotational mechanical energy into potential energy.

In one embodiment, a mechanical energy storage device comprises a means for converting rotation into potential energy.

In one embodiment, a mechanical energy storage device comprises a spring system comprising one or more springs, a means for converting mechanical power into potential energy stored in said springs and a means for releasing said potential energy back into mechanical power.

In one embodiment, a mechanical energy storage device comprises a flywheel system comprising one or more flywheels, a means for converting mechanical power into rotational mechanical energy stored in said flywheels and a means for releasing said rotational mechanical energy back into mechanical power.

In one embodiment, an energy storage device comprises a mechanical energy storage device.

Geolocation Terminology

In one embodiment, a geolocation comprises the identification or estimation of the real-world geographic location of an object.

In one embodiment, a geolocation comprises a latitude and a longitude.

In one embodiment, a geolocation comprises a latitude, a longitude, and an altitude.

In one embodiment, a geolocation comprises a geographic location expressed in an earth-based coordinate system.

In one embodiment, a geolocation comprises a time measurement.

In one embodiment, a satellite-based radio-navigation system comprises a global navigation satellite system ("GNSS").

In one embodiment, a satellite-based radio-navigation system comprises the United States' Global Positioning System ("GPS").

In one embodiment, a satellite-based radio-navigation system comprises Russia's GLONASS.

In one embodiment, a satellite-based radio-navigation system comprises the European Union's Galileo system.

In one embodiment, a satellite-based radio-navigation system comprises China's BeiDou Navigation Satellite System ("BDS").

In one embodiment, a satellite-based radio-navigation system comprises India's IRNSS.

In one embodiment, a satellite-based radio-navigation system comprises Japan's QZSS.

In one embodiment, a geolocation is measured by means of one or more satellite-based radio-navigation systems.

In mathematics, a hyperbola is defined as the set of points such that for any point P of the set, the absolute difference of the distances from P to two fixed points is constant.

In one embodiment, a geolocation hyperbola comprises a hyperbola wherein said two fixed points are the geolocations of two stations broadcasting radio signals.

In one embodiment, a means for constructing a geolocation hyperbola of the set of possible geolocations of a radio receiver comprises measuring the time delay of a signal sent from each broadcasting station to said radio receiver within an interval of time and calculating the absolute difference of the distances from said radio receiver to said broadcasting stations as the difference in said time delays multiplied by the speed of light.

In one embodiment, a multilateration algorithm comprises a means for measuring the geolocation of a radio receiver calculated as the intersection of two geolocation hyperbolas for said radio receiver wherein said two geolocation hyperbolas are calculated using no fewer than three broadcasting stations.

In one embodiment, a multilateration algorithm comprises a means for measuring a geolocation based on measurements of the distance to three or more stations at known geolocations by broadcast signals at known times, wherein said geolocation is calculated by means of triangulation.

In one embodiment, a geolocation is measured by means of a multilateration algorithm wherein said stations are cellular phone towers.

In one embodiment, a multilateration navigation system comprises means for determining a geolocation by means of a multilateration algorithm.

In one embodiment, a navigation system comprises a means for reading one or more geolocations by means of either a satellite-based radio-navigation system or a multilateration navigation system.

In one embodiment, a navigation system comprises a plurality of navigation systems.

In one embodiment, a navigation system comprises a means for reading one or more geolocations by means of a plurality of satellite-based radio-navigation systems and multilateration navigation systems.

State and Event Terminology

In one embodiment, a towed transport platform state comprises a state of a towed transport platform.

In one embodiment, a towed transport platform state comprises a state of a towed transport platform at a given point in time.

In one embodiment, a towed transport platform state comprises the geolocation of a towed transport platform.

In one embodiment, a towed transport platform state comprises whether or not a towed transport platform is physically coupled to a tractor platform.

In one embodiment, a towed transport platform state comprises whether or not a towed transport platform is electrically coupled to a tractor platform.

In one embodiment, a towed transport platform state comprises whether or not an intermodal shipping container is physically coupled to a chassis.

In one embodiment, a towed transport platform state comprises whether a door physically coupled to said towed transport platform is open or closed.

In one embodiment, a towed transport platform state comprises whether or not said towed transport platform is moving.

In one embodiment, a towed transport platform state comprises whether or not cellular network jamming is being detected at said towed transport platform's location.

In one embodiment, a towed transport platform event comprises a change in a towed transport platform state.

In one embodiment, a towed transport platform event comprises said towed transport platform transitioning between a stationary state and moving state.

In one embodiment, a towed transport platform event comprises a change in the geolocation of said towed transport platform.

In one embodiment, a towed transport platform event comprises an impact of said towed transport platform with another physical object.

In one embodiment, a towed transport platform event comprises said towed transport platform undergoing an unusual rotation.

In one embodiment, a towed transport platform event comprises the physical connection of said towed transport platform to a tractor platform.

In one embodiment, a towed transport platform event comprises the physical disconnection of said towed transport platform from a tractor platform.

In one embodiment, a towed transport platform event comprises the electrical connection of said towed transport platform to a tractor platform.

In one embodiment, a towed transport platform event comprises the electrical disconnection of said towed transport platform from a tractor platform.

In one embodiment, a towed transport platform event comprises the physical coupling of an intermodal shipping container to a chassis.

In one embodiment, a towed transport platform event comprises the physical uncoupling of an intermodal shipping container from a chassis.

In one embodiment, a towed transport platform event comprises the opening or closing of a door physically coupled to said towed transport platform.

In one embodiment, a towed transport platform event comprises the starting or ending of cellular network jamming in the vicinity of said towed transport platform at said towed transport platform's location.

Monitoring System Terminology

In one embodiment, a monitoring system comprises a means for reading a towed transport platform state.

In one embodiment, a monitoring system comprises a means for recording a towed transport platform state.

In one embodiment, a monitoring system comprises a means for transmitting a towed transport platform state.

In one embodiment, a monitoring system comprises a means for detecting a towed transport platform event.

In one embodiment, a monitoring system comprises a means for recording a towed transport platform event.

In one embodiment, a monitoring system comprises a means for transmitting a towed transport platform event.

In one embodiment, a monitoring system is physically coupled to a towed transport platform.

In one embodiment, a computational device comprises a means for manipulating electronic signals and executing algorithms.

The devices and methods described herein are directed to continuously tracking unpowered logistics platforms such as semi-trailers and intermodal shipping containers. In some examples, a tracking device harvests the kinetic energy of oscillatory movements of the shipping container to power the tracking device. In some instances, the shipping container is moving on a roadway, railway, or waterway.

In other examples, a tracking device harvests the kinetic energy of airflow moving around the shipping container. In some instances, the airflow is caused by movement of the shipping container. In other instances, the airflow may be caused by ambient weather such that air is flowing around a stationary shipping container.

In further examples, a tracking device may be configured to harvest kinetic energy from both oscillatory movement of the shipping container and airflow moving around the shipping container. In still further examples, a tracking device may be configured to selectively switch between harvesting kinetic energy from oscillatory movement of the shipping container and airflow moving around the shipping container, based on any suitable factors.

In physics, vibration and swaying are, fundamentally, both oscillations, with vibrations having a higher frequency and smaller amplitude and swaying having a lower frequency and higher amplitude. The main difference between vibration and swaying is that vibration energy is normally harvested using piezoelectric devices and swaying energy is normally harvested by a mechanical linkage that induces current by moving magnets by or through inductive coils. The term "oscillation" is used herein to cover both vibration and sway.

Since an unpowered logistics platform may not always be in motion, such as when in stop-and-go traffic, it may be that kinetic energy can only be harvested some of the time during a trip. The power produced generally increases with speed. For example, the energy contained in a column of air passing through a turbine varies with the cube of the airflow velocity. Thus, an unpowered logistics platform moving at 10 meters per second (22.4 mph) should provide airflow with eight times the kinetic energy as when the logistics platform is moving at half that speed, 5 meters per second (11.2 mph).

The power generated by wheel rotation is normally linear with its rotational speed. The power generated by oscillations increases and decreases with increasing and decreasing amplitude, respectively, and the oscillations typically increase with speed. Thus, an optimized energy harvesting system will store excess energy when an unpowered logistics platform is moving faster, providing available energy for tracking when it is moving slower. Mechanisms for storing excess energy include electrically charging a battery or capacitor (especially supercapacitors and ultracapacitors), spinning up a flywheel, compressing a spring, lifting a mass higher in the earth's gravitational field, compressing a fluid pressurized in a vessel, and converting the excess energy into thermal energy that is stored in a thermal energy storage device.

The mechanical methods for storing energy require mechanical motion. Since kinetic energy may have been converted into electrical power when it was harvested, it may be converted into mechanical energy by means of a motor in order to turn a flywheel, compress a spring, or lift a mass. Conversely, a motor may be used as a generator to convert the energy stored in a spinning flywheel, compressed spring, or elevated mass back into electrical energy when it is needed to run the tracking device, such as when the unpowered logistics platform is moving slowly or has stopped.

Harvesting the kinetic energy of a moving unpowered logistics platform advantageously enables continuous tracking of these platforms, which was not previously practicable. Continuous tracking includes sending real-time location updates to a server via a cellular network, which requires about one watt of continuous power expenditure using current cellular modem technology. In some of the examples described herein, the battery of the tracking device does not need to be changed or recharged.

While some existing tracking devices can use tractor power if the unpowered logistics platform is a semi-trailer, tractor power is often not available and is dependent on the tractor configuration. The devices and methods described herein continuously provide tracking for unpowered logistics platforms, whereas the "tractor power" trackers depend on the tractor being configured to provide power to a tracking device. Moreover, the devices and methods described herein overcome the shortcomings of previous solutions, which do not have enough power to track continuously and can only track intermittently (e.g., one to four location reports per day).

Although the different examples of tracking devices and methods of using tracking devices may be described separately, any of the features of any of the examples may be added to, omitted from, or combined with any other example.

FIG. 1 is a block diagram of an example of a tracking device that generates power from the oscillatory movement of a shipping container. The generated power is used to power tracking device 100, which is configured to track a geolocation of the shipping container in which tracking device 100 is disposed. Tracking device 100 comprises inductor 102, magnet 104, navigation system 106, processor 108, transmitter 110, and energy storage device 112. In the example shown in FIG. 1, the components of tracking device 100 are encapsulated within a tracking device housing that is placed within, attached to, or integrated within a shipping container. In other examples, one or more of the components are not located within a tracking device housing.

Inductor 102 and magnet 104 are movable relative to each other. In the example shown in FIG. 1, inductor 102 is stationary (e.g., fixed within a housing of tracking device 100 or fixed to a portion of a shipping container whose geolocation is being tracked), and magnet 104 is movable relative to inductor 102 such that the relative movement between magnet 104 and inductor 102 caused by oscillatory movement of the shipping container induces electrical power. In other examples, magnet 104 is stationary, and inductor 102 is movable relative to magnet 104. In further examples, magnet 104 and inductor 102 may both be movable so long as their relative movement to each other induces electrical power. In still further examples, any other number and configuration of magnets 104 and inductors 102 may be used in tracking device 100 to induce electrical power.

Navigation system 106 is configured to determine geolocation information of the shipping container to which tracking device 100 is attached. Global Navigation Satellite System (GNSS) is an umbrella term that encompasses all global satellite positioning systems. This includes constellations of satellites orbiting over the Earth's surface and continuously transmitting signals that enable users to determine their position. The Global Positioning System (GPS) is one example of a Global Navigation Satellite System. Besides GPS, there are other satellite navigation systems, such as Russia's Global Navigation Satellite System (GLONASS), China's BeiDou Navigation Satellite System (BDS), and the European Union's Galileo. Japan's Quasi-Zenith Satellite System (QZSS) is a GPS satellite-based augmentation system to enhance GPS's accuracy, with satellite navigation independent of GPS scheduled for 2023. India has the Indian Regional Navigation Satellite System (IRNSS), also known as Navigation with Indian Constellation (NAVIC), an autonomous regional satellite navigation system that provides accurate real-time positioning and timing services, with plans to expand to a global version in the long-term.

In the example shown in FIG. 1, navigation system 106 comprises a receiver configured to receive and process GPS signals to determine geolocation information of the shipping container to which tracking device 100 is attached. In other examples, navigation system 106 may comprise a receiver configured to receive and process signals from other GNSSs to determine geolocation information. In further examples, navigation system 106 may comprise multiple receivers, each configured to receive and process signals from different GNSSs to determine geolocation information.

Navigation system 106 provides the geolocation information of the shipping container to processor 108, which is configured to log a set of the geolocation information of the shipping container. As used herein, processor 108 includes any combination of hardware, software, and/or firmware for executing the functions described herein as well as facilitating the overall functionality of tracking device 100. In some examples, processor 108 may be a microprocessor or processor arrangement (e.g., on which code is running) connected to memory (not shown in FIG. 1).

Processor 108 provides the set of geolocation information to transmitter 110, which is configured to transmit at least a portion of the set of determined geolocation information to a server. Transmitter 110 includes electronics configured to transmit wireless signals. In some situations, transmitter 110 may include multiple transmitters. Transmitter 110 transmits signals through an antenna (not shown in FIG. 1). In some circumstances, the antenna may include multiple antennas.

Transmitter 110, in the example of FIG. 1, performs radio frequency (RF) processing including modulation. Transmitter 110 includes a modulator (not shown in FIG. 1) that modulates the signals that contain geolocation information and can apply any one of a plurality of modulation orders. Transmitter 110 may include filters, amplifiers, isolators, matching circuits, and other RF components.

Energy storage device 112 is coupled to the inductor and is configured to store energy during a first time period and to provide the stored energy to power tracking device 100 during a second time period. Thus, energy storage device 112 may store energy that is generated when the shipping container is moving (e.g., during a first time period) and provide the stored energy to power tracking device 100 when the shipping container is no longer in motion (e.g., during a second time period). In some examples, energy storage device 112 comprises one or more of the following: a flywheel, a capacitor, a battery, a spring, compressible fluid pressurized in a vessel, a mass lifted in a gravitational field, and a thermal energy storage device.

Figure 2:
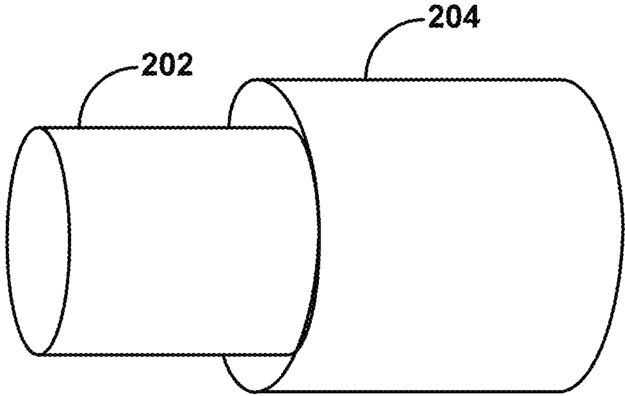
FIG. 2 is an example of a cylindrical magnet that is movable within a sleeve to which an inductor coil is coupled.

FIG. 2 is an example of a cylindrical magnet that is movable within a sleeve to which an inductor coil is coupled. More specifically, the configuration of FIG. 2 includes an example in which magnet 104 of FIG. 1 is magnetically charged shaft 202 (or coupled to shaft 202) that is movable within sleeve 204. Sleeve 204 has an inductor either integrated within or located adjacent to the body of sleeve 204 such that movement of shaft 202 within sleeve 204 (e.g., caused by oscillatory movement of the shipping container) induces electrical power.

In some examples, the motion of shaft 202 is linear along the longitudinal axis of shaft 202. In other examples, the motion of shaft 202 is rotational about the longitudinal axis of shaft 202. In further examples, the motion of shaft 202 may be both linear and rotational. In still further examples, shaft 202 may be stationary, and sleeve 204 may move relative to shaft 202 in a linear manner, a rotational manner, or both a linear manner and a rotational manner.

When generating power through linear motion of the magnet/inductor, the amount of power generated is optimized if the direction of motion of the shaft is aligned with the direction of motion along which the oscillations occur. Thus, the amount of power generated will be zero if direction of motion of the shaft is orthogonal to the direction of motion along which the oscillations occur.

The oscillation frequency and amplitude will likely vary depending on the medium of transportation and the relative alignment between the direction of motion of the shaft and the direction of motion of the oscillations. When the medium of transportation is a roadway: vertical oscillations will likely be caused by driving over bumps, lateral oscillations will likely be caused by swaying side to side, and longitudinal oscillations will likely be caused by accelerations and decelerations. When the medium of transportation is an ocean or other waterway (e.g., a shipping container on a ship), there will be both vertical oscillations and lateral oscillations due to waves in the ocean, river, etc.

Figure 3:
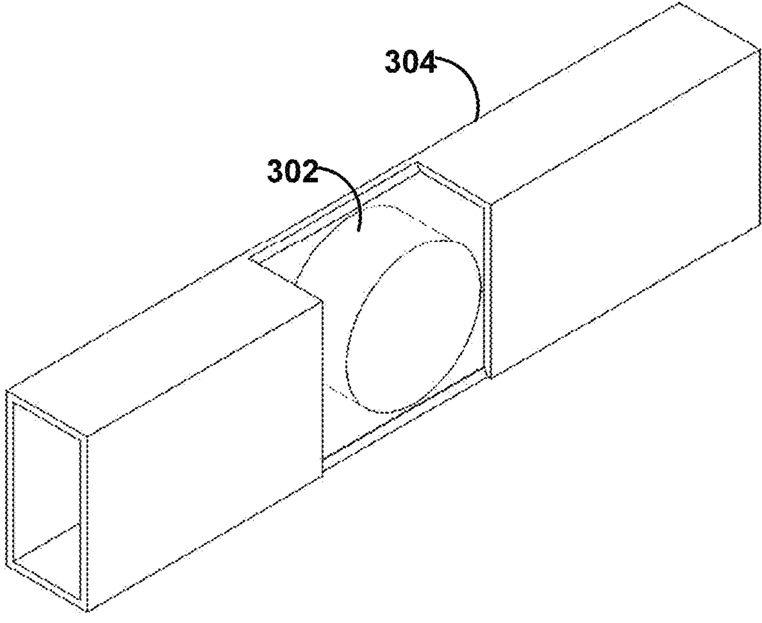
FIG. 3 is a cutout, perspective view of an example of a cylindrical magnet that is rollable within a rectangular sleeve to which an inductor coil is coupled.

FIG. 3 is cutout, perspective view of an example of a cylindrical magnet that is rollable within a rectangular sleeve surrounded by, or coupled to, an inductor. More specifically, the configuration of FIG. 3 includes an example in which magnet 104 of FIG. 1 is a cylindrical magnet 302 that is rollable along its horizontal axis within a rectangular sleeve 304. Rectangular sleeve 304 has an inductor either integrated within or located adjacent to the body of rectangular sleeve 304 such that movement of magnet 302 within rectangular sleeve 304 (e.g., caused by oscillatory movement of the shipping container) induces voltage in the inductor, which is used to generate electrical power.

In other examples, cylindrical magnet 302 may slide, rather than roll, within the interior of rectangular sleeve 304, thereby inducing electrical power. In further examples, cylindrical magnet 302 may be able to roll and slide within the interior of rectangular sleeve 304, thereby inducing electrical power.

In other examples, magnet 302 may have any suitable size and shape that permits movement within sleeve 304. For example, magnet 302 may have at least one rounded surface (e.g., generally cylindrical or spherical in shape) in order to facilitate rolling/sliding back and forth within the interior of sleeve 304. In other examples, sleeve 304 may have any suitable size and shape (e.g., circular cross section, square cross section, rectangular cross section) that permits movement of magnet 302 within the interior of sleeve 304. In further examples, the shape of the sleeve 304 is not required to match the shape of the magnet 302 (e.g., a square cross section sleeve could accommodate a spherical magnet).

In still further examples, an inductor having at least one rounded surface may be configured to move (e.g., roll, slide, or both) within the interior of a magnetically charged sleeve in order to induce electrical power.

Figure 4:
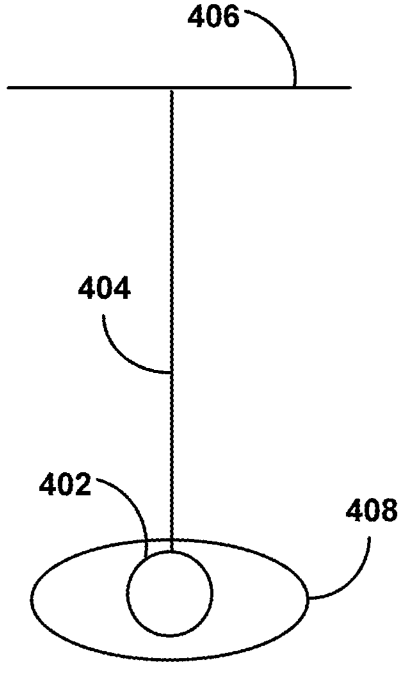
FIG. 4 is an example of a pendulum mass that is movable relative to a stationary element, wherein one of the pendulum mass and the stationary element is magnetized and the other is an inductor coil.

FIG. 4 is an example of a pendulum mass that is movable relative to a stationary element, wherein one of the pendulum mass and the stationary element is magnetized and the other is an inductor coil. For examples in which the mass is magnetized, magnet 104 of FIG. 1 is magnetic pendulum mass 402 (or coupled to mass 402), which is suspended by rod/cord 404 from axle 406. Pendulum mass 402 is movable relative to stationary inductor coil 408 in response to oscillatory movement of the shipping container, inducing electrical power.

For examples in which the mass is an inductor, inductor 102 of FIG. 1 is pendulum mass 402 (or coupled to mass 402), which is suspended by rod/cord 404 from axle 406. Pendulum mass 402 is movable relative to stationary magnetic coil 408 in response to oscillatory movement of the shipping container, inducing electrical power.

In some examples, mass 402 rotates at a fixed distance from the axle 406. In some examples, mass 402 rotates at a distance from axle 406 that varies according to the angle of rotation. In other examples, mass 402 rotates at a distance from axle 406 that varies according to a control signal generated by processor 108.

In some examples, the pendulum is oriented in a gravitational field such that the gravitational force causes it to come to rest at a particular angle. In such examples, oscillations move mass 402 away from this rest angle and at a later time the force of gravity causes mass 402 to return to the rest angle and swing past it in the other direction.

In some examples, the pendulum's axis of rotation is oriented parallel to a gravitational field such that the gravitational force is orthogonal to the plane of rotation and has little or no effect on the pendulum's motion.

In some examples, mass 402 rotates continuously in one direction when accelerated by the axis' motion.

In some examples, the motion of mass 402 turns a generator shaft, causing electrical power generation.

In some examples, mass 402 is connected to a pivot point, as opposed to axle 406, and can swing in any direction around the pivot point. As with a pendulum rotating in a plane around an axis, the distance of mass 402 from the pivot point may be varied with the angle.

Figure 5:
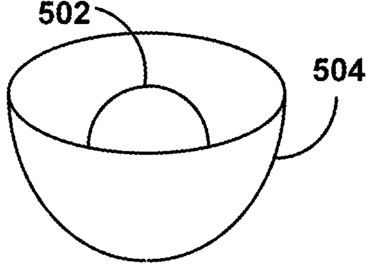
FIG. 5 is an example of a magnetically charged ball movably disposed within a concave surface that has an inductor integrated into, or disposed adjacent to, the concave surface.

FIG. 5 is an example of a magnetically charged ball movably disposed within a concave surface that has an inductor integrated into, or disposed adjacent to, the concave surface. More specifically, the configuration of FIG. 5 includes an example in which magnet 104 of FIG. 1 is a magnetically charged ball 502 (e.g., sphere) movably disposed within a generally concave surface 504. An inductor is integrated into, or disposed adjacent to, concave surface 504. The magnetically charged ball 502 is movable relative to the inductor in response to oscillatory movement of the shipping container. Movement of the shipping container causes magnetically charged ball 502 to move relative to concave surface 504, inducing electrical power.

In some examples, concave surface 504 has a circular profile around its vertical axis. In other examples, concave surface 504 has an elliptical profile around its vertical axis.

In other examples, magnetically charged ball 502 may have any shape that allows movement of magnetically charged ball 502 within concave surface 504. In further examples, concave surface 504 has a shape that maximizes the amount of induced electrical power based on current or expected oscillatory movement of the shipping container. In some of these examples, processor 108 may be configured to determine the shape of concave surface 504 that would maximize the amount of induced electrical power, and the shape of concave surface 504 may be dynamically modified by a control system (not explicitly shown). Similarly, processor 108 may be configured to determine the shape of magnetically charged ball 502 that would maximize the amount of induced electrical power, and the shape of magnetically charged ball 502 may be dynamically modified by a control system (not explicitly shown).

In still further examples, in order to harness the energy of oscillations parallel to the gravitational axis (up and down motion), magnetically charged ball 502 and concave surface 504 sit in a magnetic field at an angle to the gravitational field such that the vertical axis of concave surface 504 is oriented at an angle to the gravitational axis.

Figure 6:
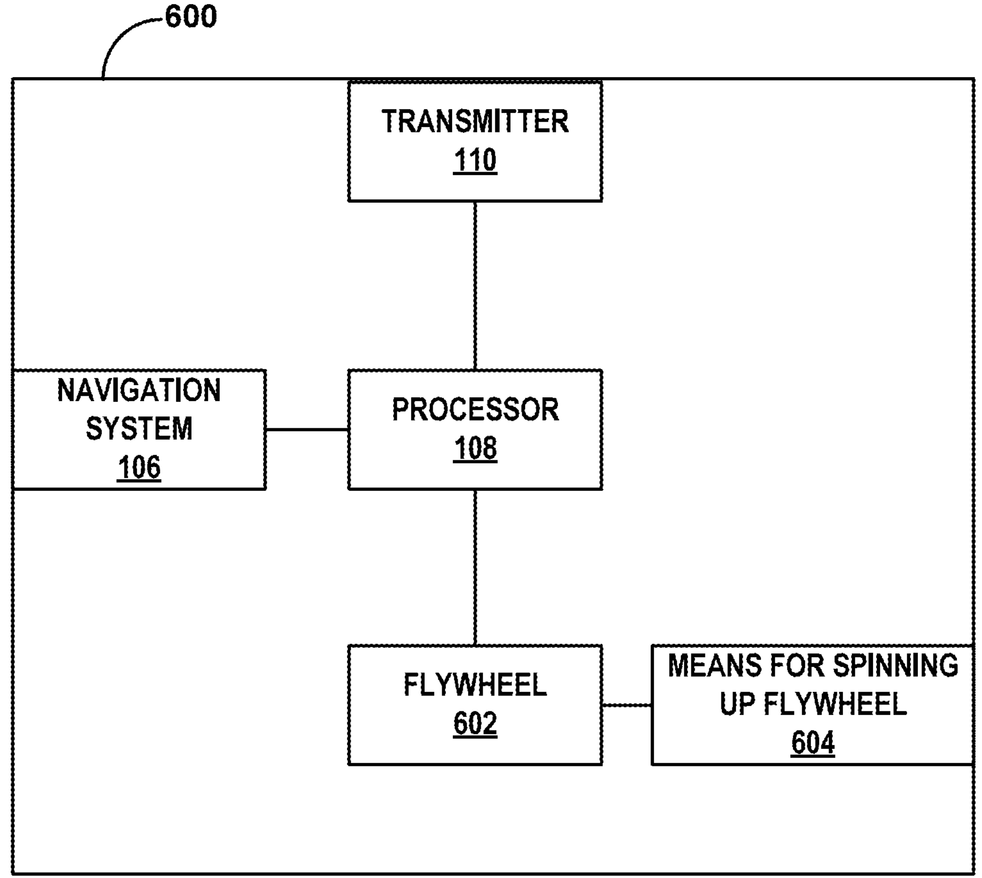
FIG. 6 is block diagram of an example of a tracking device that spins up a flywheel and utilizes the rotational energy of the spinning flywheel to power the tracking device.

FIG. 6 is a block diagram of an example of a tracking device that spins up a flywheel and utilizes the rotational energy of the spinning flywheel to power the tracking device. Similar to tracking device 100 shown in FIG. 1, tracking device 600 comprises navigation system 106, processor 108, and transmitter 110, each of which have been discussed previously. However, tracking device 600 also comprises flywheel 602 and means for spinning up the flywheel 604. The means for spinning up a flywheel 604 spins up flywheel 602 such that flywheel 602 stores energy during a first time period (e.g., while the shipping container is in motion) and provides the stored energy to tracking device 600 during a second time period (e.g., when the shipping container is no longer in motion). In some examples, tracking device 600 may also include a battery and/or capacitor configured to store energy for later use by tracking device 600.

In the example shown in FIG. 6, the components of tracking device 600 are encapsulated within a tracking device housing that is placed within, attached to, or integrated within a shipping container. In other examples, one or more of the components are not located within a tracking device housing.

Figure 7:
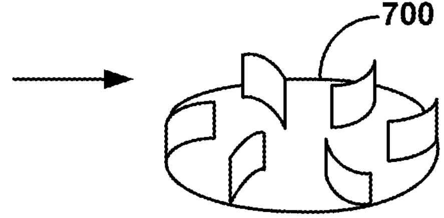
FIG. 7 is a first example of a cross-flow turbine.
Figure 8:
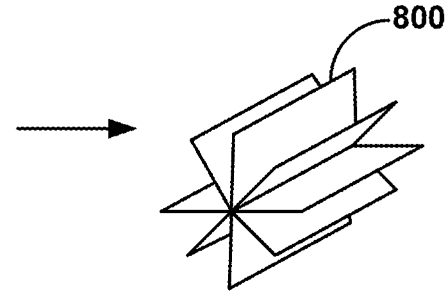
FIG. 8 is a second example of a cross-flow turbine.

In some examples, the means for spinning up the flywheel 604 is a turbine disposed within a recess formed within an external surface of the shipping container such that airflow around the shipping container causes the turbine to spin. FIGS. 7 and 8 show examples of cross-flow turbines that may be utilized within recesses formed within the external surface of a shipping container to harvest kinetic energy from the airflow around the shipping container.

Figure 11:
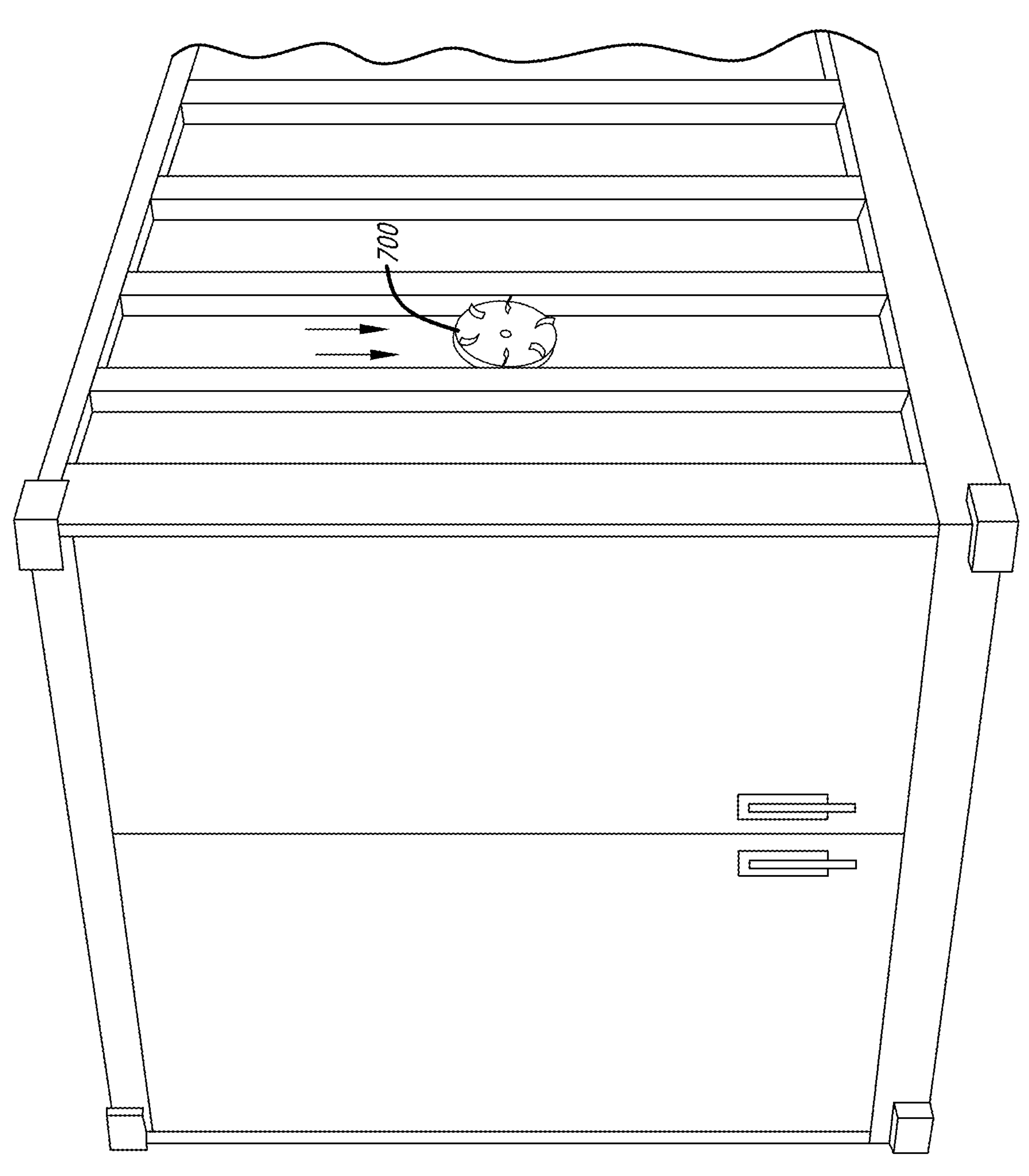
FIG. 11 is an example of the cross-flow turbine from FIG. 7 disposed within a recess formed within an external surface of a shipping container such that airflow around the shipping container causes the turbine to spin.

FIG. 7 shows an example of a cross-flow turbine 700 that is placed within a recess formed in an external surface of the shipping container such that the airflow moves in the direction of the arrow shown in FIG. 7. When the airflow contacts the curved vanes of cross-flow turbine 700, cross-flow turbine 700 spins and, through a mechanical coupling such as a rotating shaft and/or gearing, spins up flywheel 602, storing energy for later use by tracking device 600. FIG. 11 shows an example of cross-flow turbine 700 disposed within a recess formed within an external surface of a shipping container such that airflow around the shipping container causes turbine 700 to spin.

Figure 12:
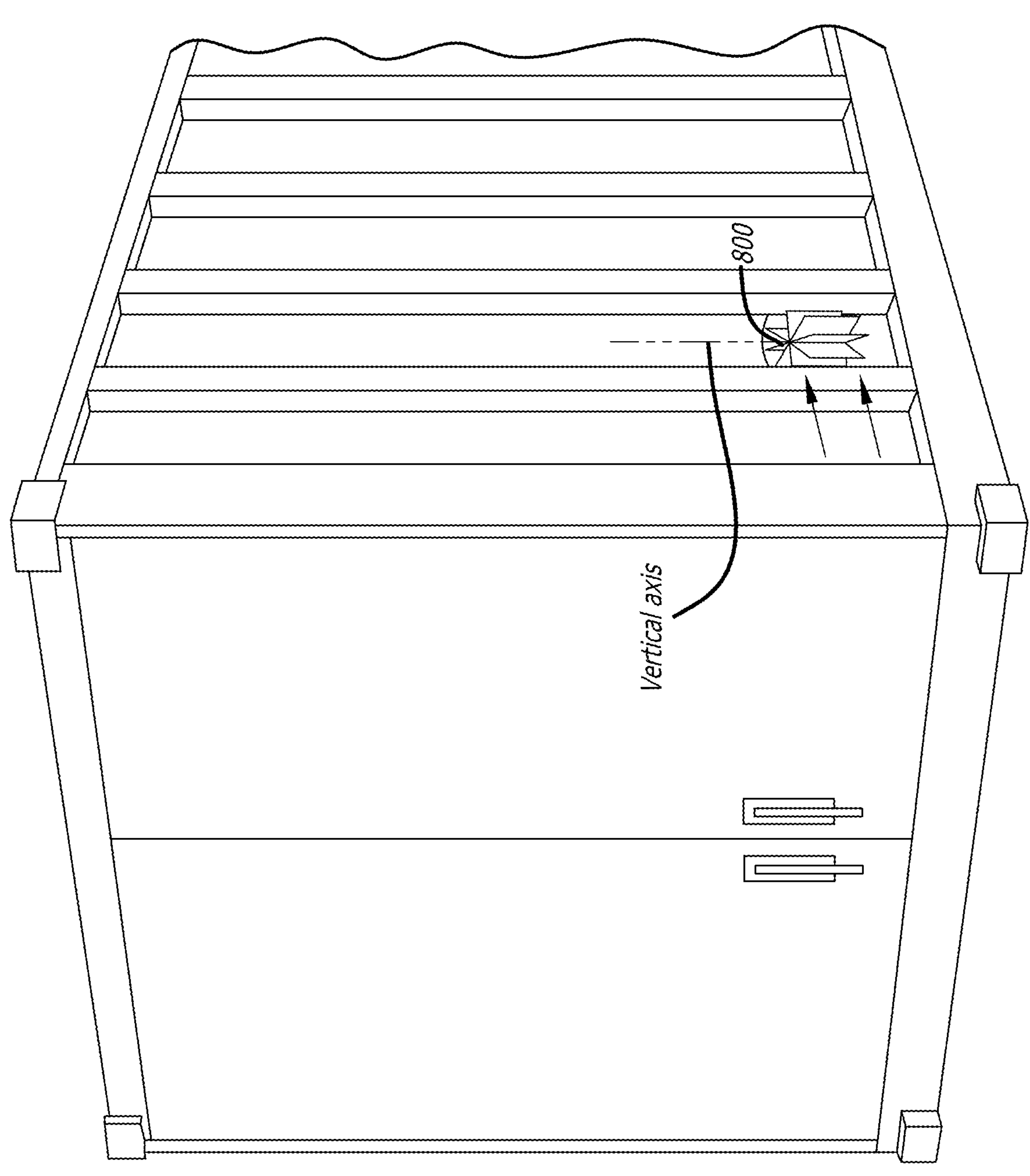
FIG. 12 is an example of the cross-flow turbine from FIG. 8 disposed within a recess formed within an external surface of a shipping container such that airflow around the shipping container causes the turbine to spin.

FIG. 8 shows an example of a cross-flow turbine 800 that is placed within a recess formed in an external surface of the shipping container such that the airflow moves in the direction of the arrow shown in FIG. 8. More specifically, cross-flow turbine 800 may be placed such that its rotation of axis is parallel to a vertical axis of a recess formed in the external surface of the shipping container. When the airflow contacts the vanes of cross-flow turbine 800, cross-flow turbine 800 spins and, through a mechanical coupling such as a rotating shaft and/or gearing, spins up flywheel 602, storing energy for later use by tracking device 600. FIG. 12 shows an example of cross-flow turbine 800 disposed within a recess formed within an external surface of a shipping container such that airflow around the shipping container causes turbine 800 to spin.

Some examples include a vertical airflow duct in an intermodal shipping container side surface channel with one or more inlets at one end (e.g., the top) and one or more outlets at the other end (e.g., the bottom), which forces airflow down through the duct to flow in a vertical direction. Within the duct is a turbine that generates power from this airflow. Ideally, these examples would not protrude from the side of the shipping container when stationary, minimizing the likelihood of being damaged as containers are raised and lowered from ships, chassis, other containers, and the ground. Only the inlet and outlet ducts may protrude when moving. In other examples, the inlet and/or outlet ducts do not protrude regardless of whether the shipping container is moving.

In some examples, the airflow inlet duct is located at the top of the shipping container, and the outlet duct is located at the bottom of the shipping container, improving water drainage from the ducts in rain or other wet conditions.

In other examples, the inlet and outlet ducts normally lie flush with the external surface of the shipping container but get pulled outwards by airflow when moving in order to "scoop" more air in (inlet) and allow more air out (outlet). In some cases, the ducts are moved outwards and inwards by one or more servos by a control system, which may be an electronic control system, a mechanical control system, and/or a pneumatic control system.

In other examples, a mechanism is included whereby the air flows into an opening in the shipping container, through a duct on the inside with a turbine within, and then out through another opening in the shipping container further back. These examples advantageously provide more volume within which to generate power and minimize the components outside the shipping container that can be damaged.

Figure 9:
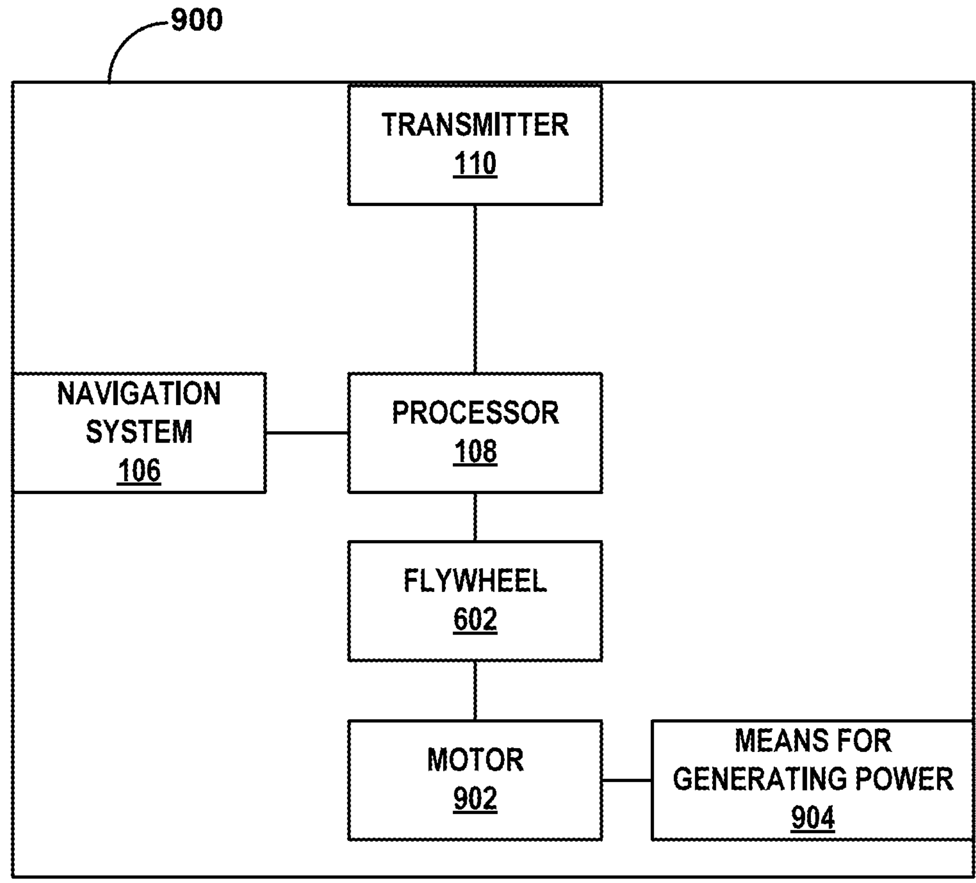
FIG. 9 is a block diagram of an example of the tracking device of FIG. 6 wherein the means for spinning up the flywheel comprises a means for generating power and a motor configured to spin up the flywheel.

FIG. 9 is a block diagram of an example of tracking device 900, which is similar to tracking device 600 of FIG. 6, wherein the means for spinning up the flywheel 604 comprises a means for generating power 904 and motor 902, coupled to the means for generating power 904, configured to spin up flywheel 602. The means for generating power 904 may include any of the devices described herein, or their equivalents, for generating power (e.g., turbines, inductor/magnet configurations, etc.). Thus, the means for generating power 904 powers motor 902 to spin up flywheel 602, storing energy that can later be used to spin motor 902 in order to generate power that can be used to power tracking device 900.

Figure 10:
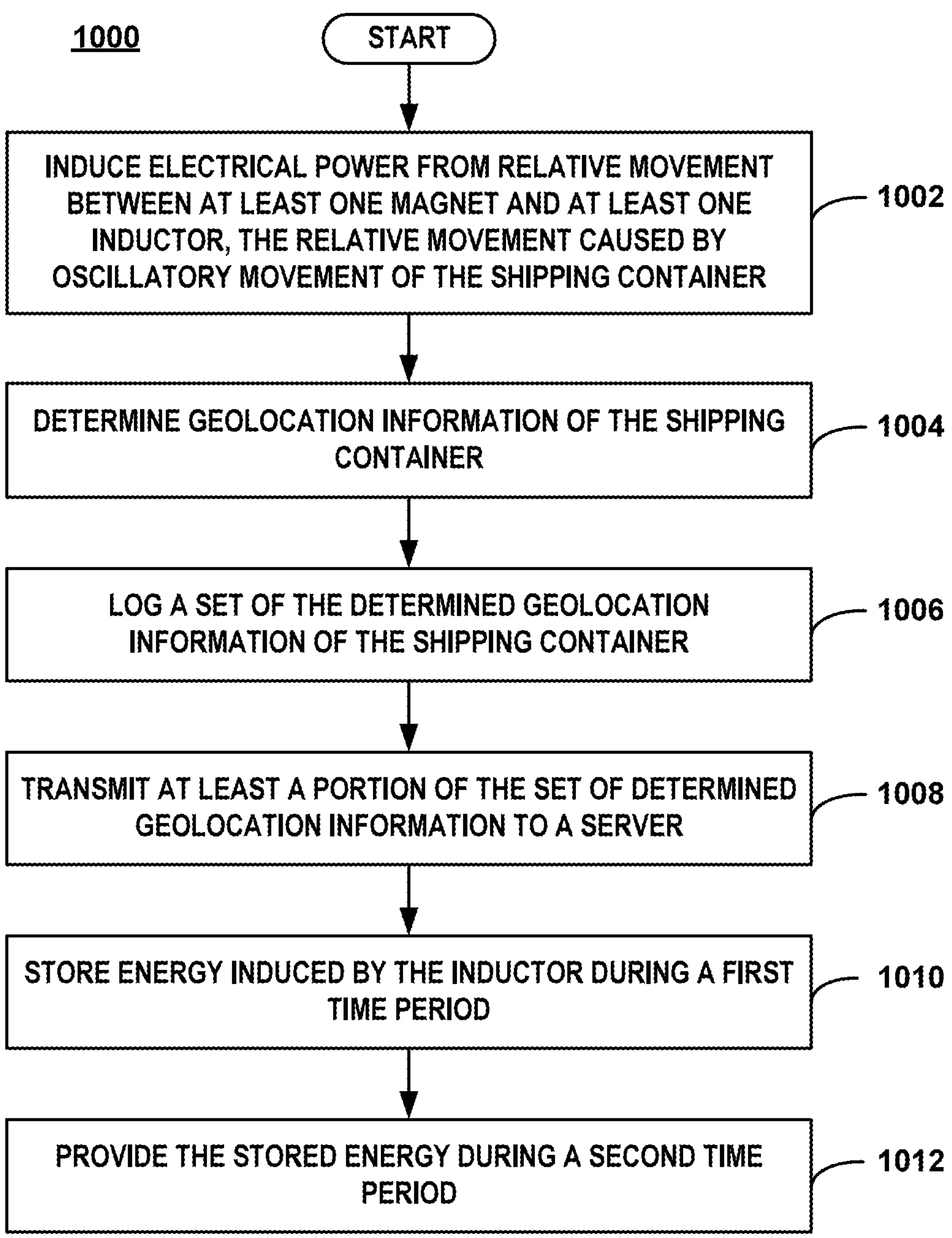
FIG. 10 is a flowchart of an example of a method for tracking a geolocation of a shipping container.

FIG. 10 is a flowchart of an example of a method for tracking a geolocation of a shipping container. The method 1000 begins at step 1002 with inducing electrical power from relative movement between at least one magnet 104 and at least one inductor 102. The relative movement between the at least one magnet and at least one inductor 102 caused by oscillatory movement of the shipping container. At step 1004, geolocation information of the shipping container is determined. At step 1006, a set of the determined geolocation information of the shipping container is logged. At step 1008, at least a portion of the set of determined geolocation information is transmitted to a server. At step 1010, energy induced by the inductor is stored during a first time period. At step 1012, the stored energy is provided during a second time period. In other examples, one or more of the steps of method 1000 may be omitted, combined, performed in parallel, or performed in a different order than that described herein or shown in FIG. 10. In still further examples, additional steps may be added to method 1000 that are not explicitly described in connection with the example shown in FIG. 10.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A method for tracking a geolocation of a shipping container, the method comprising:

inducing electrical power from relative movement between at least one magnet and at least one inductor of a tracking device, the relative movement caused by oscillatory movement of a shipping container, wherein the at least one inductor has at least one inductor coil physically coupled to a sleeve, the at least one magnet having at least one rounded surface and being rollable within at least a portion of the sleeve in response to oscillatory movement of the shipping container;

determining geolocation information of the shipping container;

logging a set of the determined geolocation information of the shipping container;

transmitting at least a portion of the set of determined geolocation information to a server;

storing energy induced by the inductor during a first time period; and providing the stored energy to the tracking device during a second time period.

2. The method of claim 1, wherein the at least one magnet rolling within the sleeve produces varying magnetic flux within at least a portion of the at least one inductor coil.

3. A method for tracking a geolocation of a shipping container, the method comprising:

inducing electrical power from relative movement between at least one magnet and at least one inductor of a tracking device, the relative movement caused by oscillatory movement of a shipping container, wherein the at least one magnet is a magnetically charged ball and the at least one inductor is integrated into, or disposed adjacent to, a concave surface in which the magnetically charged ball is movably disposed, the magnetically charged ball movable relative to the inductor in response to oscillatory movement of the shipping container;

determining geolocation information of the shipping container;

logging a set of the determined geolocation information of the shipping container;

transmitting at least a portion of the set of determined geolocation information to a server;

storing energy induced by the inductor during a first time period; and providing the stored energy to the tracking device during a second time period.

4. The method of claim 3, wherein the energy is stored by a flywheel.

5. The method of claim 3, wherein the energy is stored in a capacitor.

6. The method of claim 3, wherein the energy is stored in a battery.

7. The method of claim 3, wherein the energy is stored in a spring.

8. The method of claim 3, wherein the energy is stored in a compressible fluid pressurized in a vessel.

9. The method of claim 3, wherein the energy is stored by a mass lifted in a gravitational field.

10. The method of claim 3, wherein the energy is stored in a thermal energy storage device.

11. A method for tracking a geolocation of a shipping container, the method comprising:

spinning up a flywheel of a tracking device such that the flywheel stores energy during a first time period and provides the stored energy to the tracking device during a second time period, wherein the flywheel is spun up by a turbine disposed within a recess formed within an external surface of a shipping container such that airflow around the shipping container causes the turbine to spin;

determining geolocation information of the shipping container;

logging a set of the determined geolocation information of the shipping container; and transmitting at least a portion of the set of determined geolocation information to a server.

12. The method of claim 11, wherein the flywheel is spun up by the turbine via a motor coupled between the turbine and the flywheel.

13. The method of claim 11, wherein the energy is further stored in a battery configured to store energy for later use by the tracking device.

14. The method of claim 11, wherein the energy is further stored in a capacitor configured to store energy for later use by the tracking device.

* * * * *